May 3, 1949. F. N. DICKERMAN 2,469,106
LANDING GEAR FOR AIRCRAFT
Filed Jan. 28, 1944 4 Sheets-Sheet 1
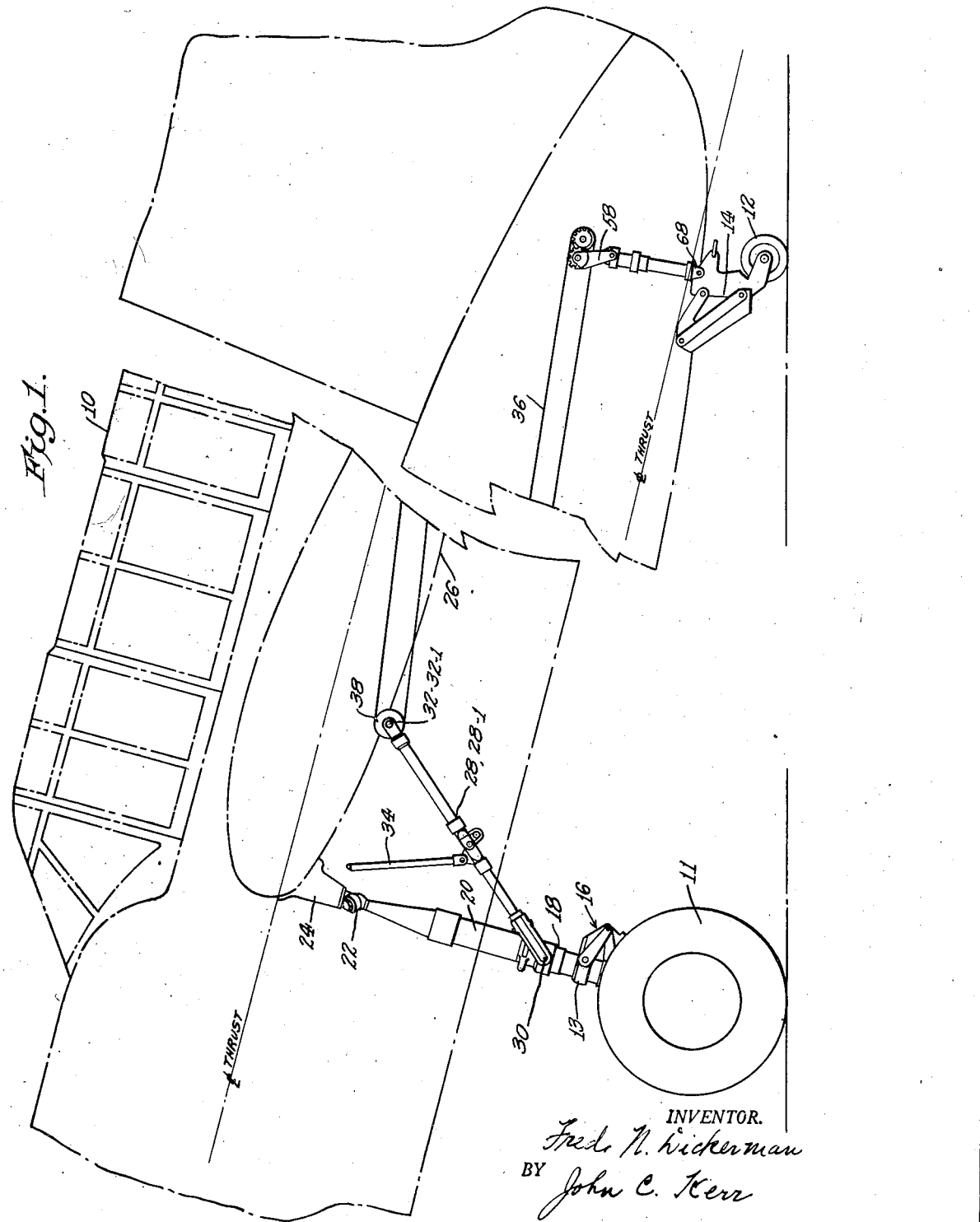
INVENTOR.
Fred. N. Dickerman
BY John C. Kerr
ATTORNEY

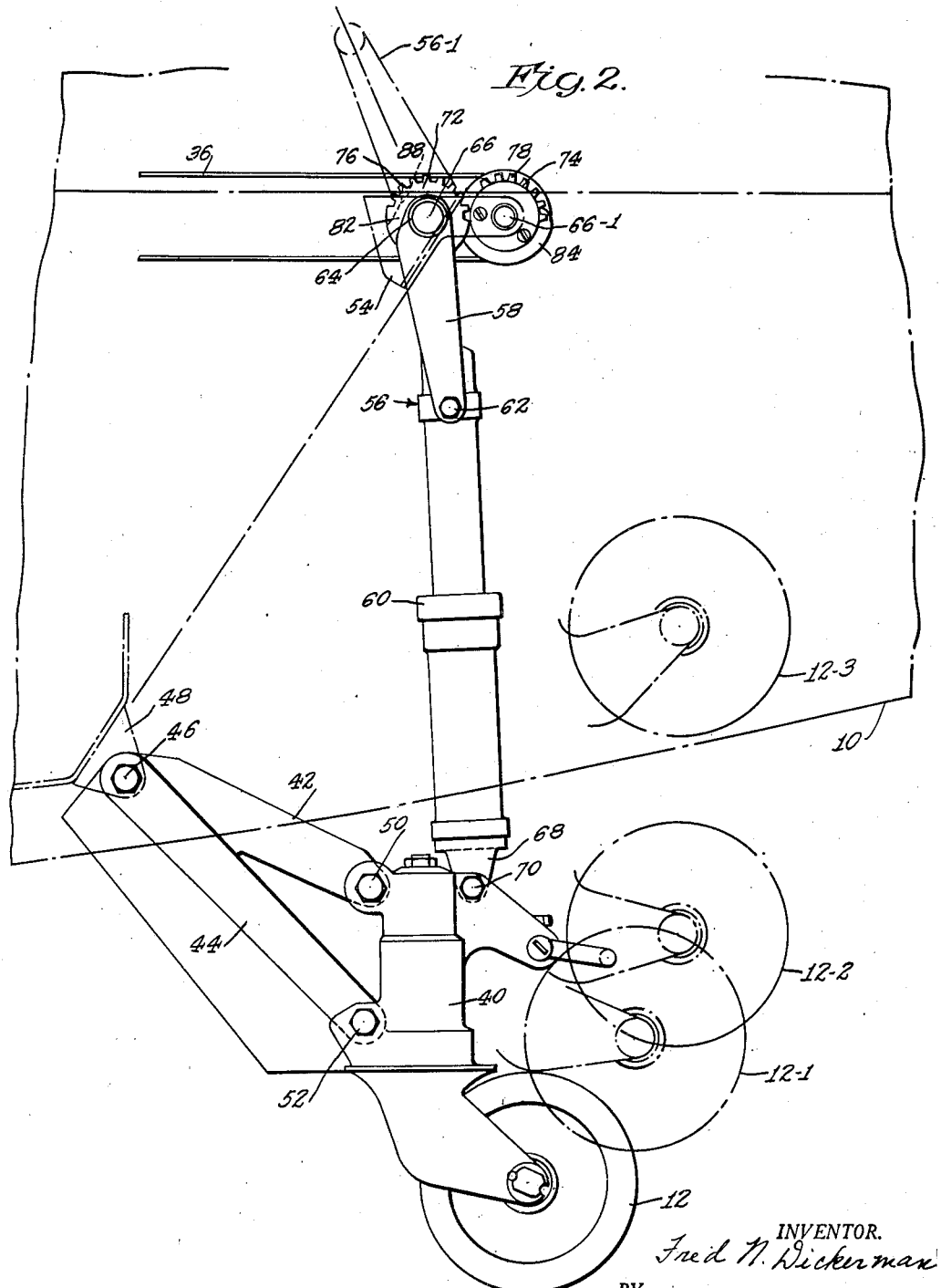

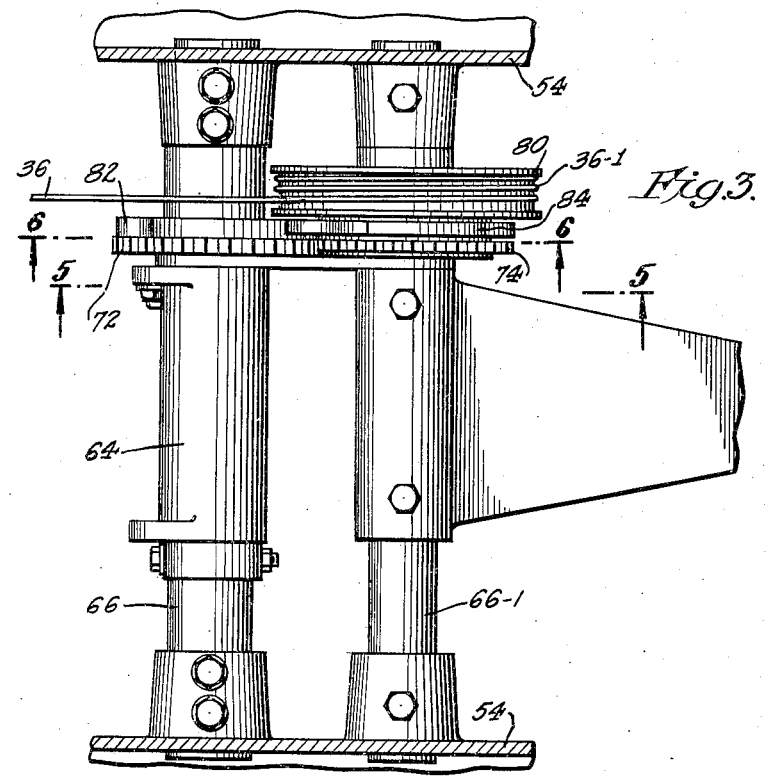
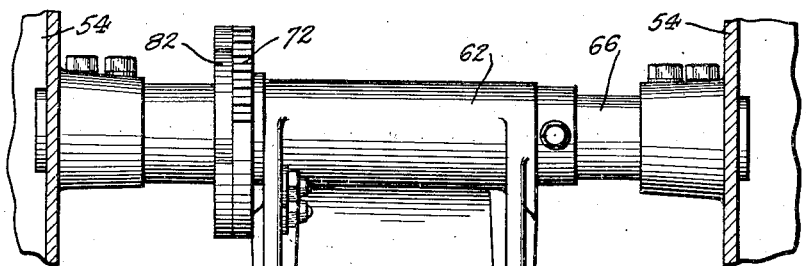
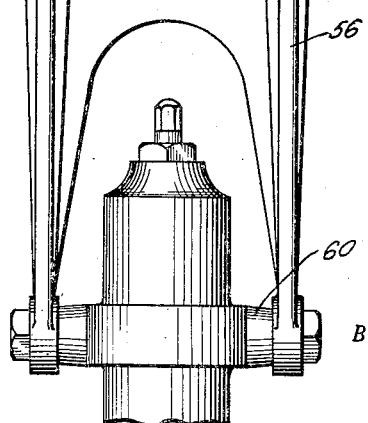

May 3, 1949.  F. N. DICKERMAN  2,469,106
LANDING GEAR FOR AIRCRAFT
Filed Jan. 28, 1944  4 Sheets-Sheet 4

INVENTOR.
Fred N. Dickerman
BY John C. Kerr
ATTORNEY

Patented May 3, 1949

2,469,106

UNITED STATES PATENT OFFICE 2,469,106

LANDING GEAR FOR AIRCRAFT

Fred N. Dickerman, Nichols, Conn., assignor to United Aircraft Corporation, East Hartford, Conn., a corporation of Delaware Application January 28, 1944, Serial No. 520,013

11 Claims. (Cl. 244—102)

This invention relates to retractable wheel mechanisms of aircraft, and like compressive-force transmitting mechanisms utilizing a flexible motion-transmitting cable for imparting a rotary or pivotal motion to a force-transmitting strut structure which is to be moved between an inoperative retracted position and an operative extended position, in which it has to be maintained in rigid operative alignment relatively to its supporting body for transmitting therebetween and another body element substantial compressive forces.

Among the objects of the invention is a novel retractable strut mechanism of the foregoing type which makes it possible to impart to the retractable strut structure the required retracting and extending motions by means of a motion-transmitting cable which operates in a manner such that when continued motion is imparted to the cable, in one or the other direction, the strut structure will be moved towards its extended or retracted position, and will automatically be locked upon reaching its extreme position, although the operating cable may continue to move with overtravel over a part of its range.

The foregoing and other objects of the invention will be best understood from the following description of exemplifications thereof, reference being had to the accompanying drawings wherein Figure 1 is a diagrammatic view of an aircraft body equipped with a retractable landing gear mechanism exemplifying one form of the invention;

Fig. 2 is an enlarged view of the principal parts of the retractable tail wheel mechanism of Fig. 1;

Fig. 3 is a top view of the upper part of the retractable wheel mechanism of Fig. 2;

Fig. 4 is an end view of the part of the mechanism shown in Fig. 3;

Figure 5:
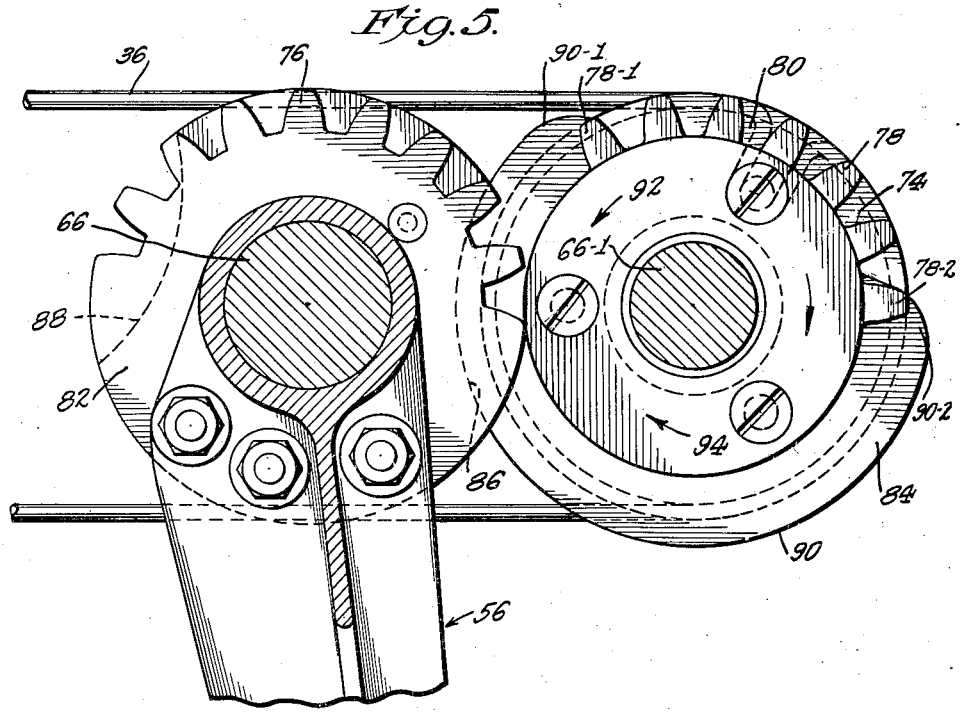
Fig. 5 is a cross-sectional view along line 5—5 of Fig. 3.

In the past, aircraft have been provided with retractable landing gear, such as retractable wheels, arranged so that the landing gear is retracted into the body of the aircraft while the aircraft is flying, the landing gear being brought to an outward extended position during the landing operation, to take up the compressive forces when the aircraft is landing.

In most cases, the aircraft has two front wheels and a tail wheel, all of which have to be retracted or extended, under the control of the pilot. In many cases, the power required to move the landing gear between its different positions is applied to the front wheels, and the tail wheel retracting mechanism is interconnected with the front wheel retracting mechanism so as to be moved in proper synchronized relation therewith.

The retractable landing wheels are usually supported on foldable strut structures extending from the aircraft body. Since the landing load is in many cases very large, and the weight of the aircraft structure must be reduced to a minimum, it is essential that the landing load shall be transmitted through the strut structure in the most efficient direct manner. To meet this requirement, the retractable strut structure of each wheel has usually two pivotally joined strut arms which are folded in the retracted position and are unfolded for landing, and the two strut arms must be held in axial alignment with each other in predetermined fixed relation to the aircraft body so that they are able to transmit the large landing loads in the form of compressive forces acting in the axial direction of the unfolded strut structure.

For these reasons, it is essential that the actuating mechanism which moves the landing gear to its different positions shall operate with a high degree of reliability in bringing the foldable strut structure from its retracted position to its predeterminedly axially-aligned extended position, in which it must be fully effective in transmitting the principal part of the landing load in the form of compressive forces.

In all prior arrangements which used flexible cable links for actuating the retractable landing gear to its different positions, such proper alignment of the landing gear presented difficult problems, because a flexible cable link inherently extends in use and cannot be relied upon for bringing the land gear to its accurately fixed, fully effective landing position. All past efforts to overcome these difficulties to a limited extent by frequent adjustment of the length of the operating cable, do not present any solution of this problem.

In accordance with the invention, the difficulties encountered with prior cable-link actuating mechanisms for retractable compressive-force-transmitting strut structures of aircraft, and other applications, are overcome by combining the link actuating strut mechanism with a driven gear member connected to the pivotally mounted strut structure and a driving gear member interconnected with the link mechanism, the driving gear and the driven gear being provided with gear portions and interlocking elements so arranged that when the longitudinal motion of the driving link moves the driving gear over a part of its range, its gear portion establishes selective driving engagement with the gear portion of the driven gear member so as to drive it and its strut structure to the retracted or extended positions and to automatically break said driving engagement when the driven gear is brought either to the retracted or to the extended predeterminedly-aligned operative position, and to cause the interlocking elements associated with the two gear members to automatically lock the driven gear member and its strut structure when the strut structure is brought by the motion of the cable link to the extended position as well as to the retracted position, depending on the requirements.

Although generally applicable to any type of retractable landing gear mechanisms and similar compressive-force-transmitting retractable strut mechanisms, the present invention has been developed for use in connection with a retractable strut mechanism for the tail wheel of an aircraft which is actuated to operate in a predetermined synchronized manner with the front wheel strut mechanism by a motion-transmitting flexible-cable link, and a practical exemplification of the invention as applied to a tail wheel retracting mechanism will now be described in connection with Figs. 1 to 6.

In Fig. 1 is shown a side view of an aircraft body 10 having a pair of retractable front landing wheels 11, only one of which is visible, and a retractable tail landing wheel 12, the several wheels being connected to the body 10 by front-wheel and rear-wheel strut mechanisms 13 and 14, respectively. The strut structure of the strut mechanisms may be of any known type, and any suitable known power mechanism may be used for actuating the wheel mechanisms between their retracted and extended positions.

The front wheel mechanism comprises two similar conventional main landing gear wheel assemblies, only one of which is described, one being mounted on the left side and the other on the right side of the fuselage, in lateral alignment, and so as to be retractable into wells on the underside of the wing center section.

The revolvably-mounted wheel assembly 16 is carried by a conventional wheel housing 18 which is assembled in axial alignment with a conventional oleo-pneumatic shock absorber strut 20, the upper end of which is attached to pivotal member 22 which is rotatably attached to mounting portion 24 of the main airplane body 10.

Also interconnecting the main wheel assembly to aircraft body 10, or more directly, to the underside of the wing center section 26, are two drag link members 28 and 28—1, the latter not visible, the lowermost extremities of which are pivotally attached at 30 to opposite sides of wheel housing 18, and the upper ends of which are suitably connected to mounting structure 32 and 32—1 respectively (32—1 not visible in Fig. 1) so as to enable pivotal movement of the entire front wheel mechanism between its extended position indicated in Fig. 1 and its interior retracted position not shown.

To yield additional support to the structure, but at the same time arranged so as not to interfere with the extension and retraction of the wheel mechanism, are several supporting tubes such as 34, attached at about the midpoint of drag links 28 and 28—1, at their lower ends, and to mounting portion 24 of the main airfoil body 10, at their upper ends. Retraction of this front wheel mechanism may be accomplished by applying torque to links 28 and 28—1 in a counterclockwise direction or by some other means which will be apparent to those skilled in the art.

The front-wheel strut mechanism 13 is interconnected with the rear-wheel strut mechanism 14 through a motion-transmitting connection including a flexible motion-transmitting link in the form of a conventional cable 36 interconnected between an operating element or torque tube 38 of the front-wheel strut mechanism 13 and an operating element of the rear-wheel strut mechanism 14 and so arranged that the rear-wheel strut mechanism shall be actuated to either the retracted or extended positions and rigidly locked therein in predetermined synchronized relation to the corresponding motions imparted to the front-wheel strut mechanism 13. Operating element 38 on the front-wheel mechanism consists of a short torque tube extending inboard from the extremity of the drag link member 28 on the right front-wheel mechanism only, torque tube 38 being fixedly coaxially aligned with the lateral axis of the mounting center of drag link 28 so as to rotate bodily with movement of drag link 28, which motion would necessarily accompany any movement of the front-wheel mechanism toward extension or retraction from a given position. Concentrically fixed to the inboard extremity of the torque tube 38 is a cable drum of relatively large diameter to which is attached one extremity of the flexible motion-transmitting cable 36, the cable 36 being inserted through apertures in the cable drum periphery and wound around the central mounting bolt, thus yielding positive elimination of any possible slippage of cable 36.

The rear-wheel mechanism comprises a tail-wheel assembly 40, Fig. 2, carrying on two fork arms the revolvably mounted tail wheel 12 and held attached to the aircraft body by two rigid guide links 42, 44. The link members 42, 44 have their inner ends pivotally mounted at 46 on a mounting portion 48 of the aircraft body, the two outer ends of the link members 42, 44 being suitably connected at 50, 52 to mounting members of the wheel assembly so as to enable pivotal movement of the wheel assembly with its interconnecting links 42, 44 between the outer extended position shown in full line in Fig. 2, toward the interior retracted position within the aircraft body, indicated in Fig. 2 by the successive, dotted-line wheel positions 12—1, 12—2 and 12—3.

The wheel assembly 40 is further interconnected with a mounting portion 54 of the aircraft body 10 by a compressive-force-transmitting strut structure 56 having an inner strut-arm member 58 and an outer strut-arm member 60 which are pivotally joined at 62. The inner strut-arm member 58 is shown in the form of a fork having a pivot portion 64 pivotally mounted on an axle 66 held in a fixed position within the mounting portion 54 of the aircraft body. The outer strut-arm member 60 is shown formed of a conventional oleo-pneumatic shock-absorber strut and has at its outer end a pivot portion 68 pivotally connected at 70 to a portion of the wheel assembly 40.

The elements of the wheel assembly 40 and of its interconnections 42, 44 and 56 with the aircraft body 10 are so designed and correlated that when the aircraft lands while the wheel 12 and its strut mechanism are in the full-line outwardly extended position shown in Fig. 2, the main strut structure 56 is so aligned relatively to the aircraft body 10 as to be able to take up the greater part of the landing energy in the form of compressive forces acting between the aircraft body and the landing ground, and to cause all the elements of the wheel assembly 40 and its associated mechanisms to be retracted within the aircraft when the strut structure 56, 58 is turned around its pivot 66 from the full-line extended position 56 to the retracted position, indicated in Fig. 2 by the dash-dot line 56—1.

The required control motions are imparted to the inner strut-arm member 58 by the motion-transmitting connection including the driving cable 36 extending from a cable-actuating member associated with the front-wheel mechanism. The motion-transmitting connection between the driving cable 36 and the inner strut-arm member 58 includes a driven gear member 72 and a driving gear member 74 having gear portions 76, 78 arranged to establish selective driving engagement over a part of the motion imparted to the driving gear member 74; and a cable-drum member 80 substantially rigidly connected to the driving gear 74. As shown in Fig. 3, at 36—1, a portion of the cable 36 is looped several times over the drum 80 so that a longitudinal driving motion imparted to the cable in one or the other direction shall impart a corresponding driving motion to the gears 72, 74 when their gear portions 76, 78 are in driving engagement.

The gear portions 76, 78 of the two gear members 72, 74 are so arranged and proportioned relatively to the other elements of the driving interconnection between the cable 36 and the strut structure 56 as to cause the gear portion 78 of the driving gear 74 to establish driving engagement with the gear portion 76 of the driven gear 72 for moving it with the associated strut structure 56 from the retracted position 56—1 to the full-line extended position shown, or vice versa, and to automatically break the driving engagement when the motion imparted by the driving gear 74 to the driven gear 72 has brought the strut structure 56 to either the full-line extended position or the retracted position 56—1.

Figure 6:
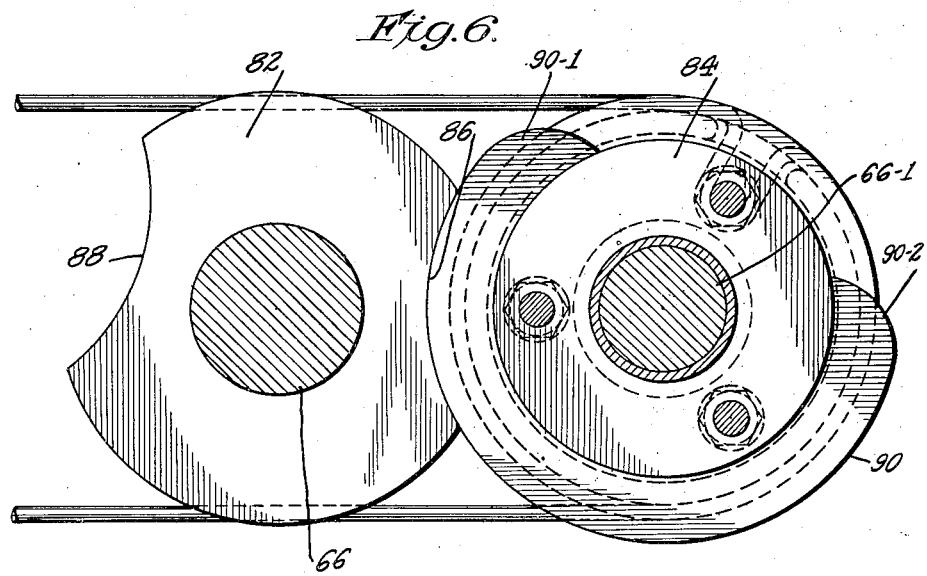
Fig. 6 is a cross-sectional view along line 6—6 of Fig. 3.

As shown in detail in Figs. 5 and 6, each of the gear members 72, 74 is also provided with an associated locking element 82, 84. The locking element 82 of the driven gear 72 has two concave circularly-shaped peripheral locking surfaces 86, 88 which are arranged to be lockingly engaged by the complementary circularly-shaped peripheral locking surface 90 of the locking element 84 of the driving gear 74 when its gear portion 78 has brought the driven gear 72 and the associated strut structure 56 to either the retracted position 56—1 or to the full-line extended position shown in Figs. 1, 2 and 5, while permitting further motion of the cable 36 and of the driving gear 74 with its locking element 84, notwithstanding the fact that the interlocking action of the locking elements 82 and 84 maintains the driven gear 72 and the associated strut structure 54 rigidly locked either in the retracted or in the extended positions.

The locking elements 82, 84 of the gear members 72, 74 and the associated mechanical elements are designed with sufficient rigidity and their interlocking surfaces are so shaped and arranged as to assure that when the driven gear 72 is brought to its extended position, the unfolded strut structure 56 is held rigidly in the desired predetermined aligned extended position shown, in which it is most effective in taking up the greater part of the landing energy in the form of compressive forces acting in its axial direction; and to assure that when the wheel mechanism has been returned to its retracted position, it will remain rigidly locked therein.

In order to assure a rigid interlocking action, the gear members 72, 74 are constructed with the required rigidity, and they are revolubly mounted on strong axle members 66, 66—1 which are secured in a substantially rigid manner to the relatively rigid mounting member portions 54, Fig. 3, of the aircraft body 10. The locking members 82, 84 of the two gear members are likewise rigid bodies and their locking surface elements 86, 88, 90 extend and are movable along planes parallel to the planes of motion of the two gear members 72, 74.

The cable drum 80 through which the motion-transmitting driving forces of the cable are transmitted to the driving gear member 74 is rigidly affixed to the driving gear member 74 and its locking member 84 and is arranged for rotary movement therewith on its axle 66—1 in planes parallel to the plane of motion of the two gear members 72, 74.

The gear members 72, 74 are shown in Figs. 5 and 6 in a position in which the locking surface 90 of the locking element 84 engages with one region of its locking surface 90 in the complementary locking surface element 86 of the locking member 82 so as to keep the driven gear member 72 with its associated strut structure 56 in the full-line extended position shown. The circular shape of the driving-gear interlocking surfaces 90 and the re-entrant circular shape of the two driven-gear locking surfaces 86, 88 make it possible to rotate the driving gear 74 while the relatively long portion of the moving interlocking surface 90 maintains interlocking engagement with relatively shorter locking surface portions 86, 88, respectively, of the driven gear 72, and while the interlocking action of the relatively long interengaging locking surface portion maintains the driven gear 72 and its associated strut-arm structure 56 rigidly locked in the extended or retracted positions, respectively.

Figs. 5 and 6 also show that—when the strut structure 56 is to be brought from the extended position shown to the retracted position, and the driving gear member 74 is actuated by the cable link 36 to move in the direction indicated by the arrow 92, the initial motion of the driving gear 74—from the position shown—will not release the interlocking engagement of its interlocking surface 90 with the complementary driven-gear interlocking surface 86, but will keep the driven gear 72 with its strut structure rigidly locked in the extended position shown in Fig. 2, until the motion of the driving gear 74 brings the end tooth 78—1, Fig. 5, of its gear segment into driving engagement with the nearby end region of the driven-gear portion 76, and substantially simultaneously therewith breaks, at the end region 90—1 of its interlocking surface 90, the interlocking engagement between the previously interlocked locking surfaces 90, 86 of the two gear portions 76, 78, respectively of gears 72 and 74.

In an analogous manner—when, in returning the strut structure 56 to the extended position shown in Figs. 1 and 5, the cable 36 rotated the driving gear 74 in the direction of the returning arrow 94, Fig. 5—the driving gear 74 will, before the end of its returning motion, release its end tooth 78—1 from the driving engagement of the associated tooth of the driven gear portion 76 substantially simultaneously, or slightly before, the end region 90—1 of its locking surface 90 comes into engagement with the nearby region of the complementary driven-gear locking surface 86.

Similar operating conditions and relations will prevail between the other end tooth 78—2, Fig. 5, of the driving gear portion 78 and the other end region 90—2 of the locking surface 90 of the driving gear with respect to the other end region of the driven gear portion 76 and the other complementary locking surface 90 of the driven gear 72—when the rotation of the driving gear 74, in the direction of the arrow 92, brings the driven gear 72 with its associated strut structure to the retracted position and locks it therein before the driving gear 74 reaches its end position, corresponding to line 56—1 in Fig. 2, as a result of the continued driving motion imparted thereto by the driving cable 36—as well as when, on returning the driven gear from its retracted position by rotating it in the direction of the arrow 94, Fig. 5, the other interlocking surface region 90—2 of the driving gear member 74 first releases its interlocking engagement with the corresponding end region of the complementary driven-gear locking surface 88 before the other end tooth gear 78—2 of the driving gear establishes driving engagement with the associated end region of the driven gear portion 76.

The cable-link operated, compressive-force transmitting, retractable landing gear mechanism for aircraft, described herein as a specific exemplification of the invention, utilizes very simple mechanical elements, and—without adding in any material way to prior link-operated retractable-gear arrangements—it is very effective in eliminating the difficulties encountered with such prior retractable landing-gear arrangements.

It will be apparent to those skilled in the art that the novel princples of the invention disclosed herein in connection with specific exemplifications thereof will suggest various other modifications and applications of the same. It is accordingly desired that in construing the breadth of the appended claims they shall not be limited to the specific exemplifications of the invention described herein.

What I claim is:

1. An airplane having at least two retractable landing members and means including meshing gears on parallel axes for retracting one of said members longitudinally of said airplane when the other one is retracted.

2. An airplane having at least two retractable landing members and means including meshing gears on parallel axes for retracting one of said members longitudinally of said airplane when the other one is retracted and returning it to landing position when the other one is returned.

3. The device of claim 1 in which the teeth of said gears extend along less than the entire circumferences of said gears.

4. The device of claim 1 in which the teeth of said gears extend along less than the entire circumferences of said gears and a cable is used to drive one of said gears.

5. An airplane having at least two retractable landing members, means including meshing gears on parallel axes for retracting one of said members when the other one is retracted, a cable to drive one of said gears and means to prevent said cable from slipping with respect to said gear.

6. A retracting device for a landing element of an aircraft, which comprises a pair of meshing gears on parallel axes, a cable for driving one of said gears and means to prevent said cable from slipping with respect to said gear.

7. A retracting device for a landing element of an aircraft, which comprises a pair of meshing gears on parallel axes and locking members for said gears attached thereto, one of said locking members having recesses along its periphery less than one hundred eighty degrees apart.

8. Landing gear for aircraft comprising a wheel carried by framework pivoted to said aircraft, a strut-arm pivoted at one end to said framework, a strut-arm pivoted to the other end of said first-named strut-arm, a pair of gear members to one of which said second-mentioned arm is rigidly connected, a driving device for rotating the other one of said gear members, said gear members having teeth that engage only when said members are in a predetermined range of position less than 360°.

9. The landing gear of claim 8 in which said driving device is a cable attached to said gear by means to prevent said cable from slipping with respect to said gear.

10. The landing gear of claim 8 in which a convex extension on one of said gear members extends into a corresponding concave portion in the other one.

11. The landing gear of claim 8 in which a convex extension on one of said gear members extends into a corresponding concave portion in the other one, said convex portion having a greater length than said concave portion.

FRED N. DICKERMAN.

REFERENCES CITED

The following references are of record in the file of this patent:

UNITED STATES PATENTS

| Number | Name | Date |
| --- | --- | --- |
| 660,351 | Whitehurst | Oct. 23, 1900 |
| 1,035,687 | Carey | Aug. 13, 1912 |
| 1,051,929 | Van Nuis | Feb. 4, 1913 |
| 1,747,563 | Yonkese | Feb. 18, 1930 |
| 1,758,206 | Van Ryan | May 13, 1930 |
| 1,761,053 | Rystedt | June 3, 1930 |
| 1,797,490 | Wilson | Mar. 24, 1931 |
| 1,906,018 | Sundling | Apr. 25, 1933 |
| 2,110,865 | Burgess | Mar. 15, 1938 |
| 2,189,093 | Weaver | Feb. 6, 1940 |
| 2,351,215 | Kleinhans et al. | June 13, 1944 |
| 2,417,725 | Zuck | Mar. 18, 1947 |